United States Patent [19]
Uno et al.

[11] 3,783,765
[45] Jan. 8, 1974

[54] PHOTOMETRIC DEVICE IN A SINGLE LENS REFLEX CAMERA OF THROUGH-THE-LENS TYPE

[75] Inventors: Naoyuki Uno, Oimachi; Katsuhiko Nomura, Kawagoe; Tadazumi Sakazaki; Koichiro Watanabe, both of Tokyo; Katsuhiro Miyata, Kawasaki; Fumio Urano, Tokyo, all of Japan

[73] Assignee: Asahi Kogaku Kogyo Kabushiki Kaisha, Tokyo-to, Japan

[22] Filed: Aug. 7, 1972

[21] Appl. No.: 278,226

[30] Foreign Application Priority Data
Aug. 9, 1971 Japan.............................. 46/70450

[52] U.S. Cl. .............................................. 95/42
[51] Int. Cl. ........................................ G03b 19/12
[58] Field of Search ..................................... 95/42

[56] References Cited
UNITED STATES PATENTS
3,575,095  4/1971  Keck................................. 95/42 X
3,540,365  11/1970  Ishizaka.............................. 95/42
3,613,543  10/1971  Mita................................... 95/42
3,631,784  1/1972  Jurenz................................ 95/42
3,672,281  6/1972  Land.................................. 95/42

Primary Examiner—Samuel S. Matthews
Assistant Examiner—Michael D. Harris
Attorney—Robert L. Parker et al.

[57] ABSTRACT

A single lens reflex camera of through-the lens type having an objective lens, a pentaprism, a snap-up mirror and a viewfinder and providing a light path for an image between the objective lens and the viewfinder across the mirror and through the pentaprism. An electrically controlled shutter system of through-the-lens type is provided having a photosensitive sensing element located in the light path and in the path of light from the viewfinder. A light intercepting means is provided together with means for moving the light intercepting means into and out of the light path at a position along the light path in between the pentaprism and the mirror.

8 Claims, 4 Drawing Figures

PATENTED JAN 8 1974

3,783,765

PHOTOMETRIC DEVICE IN A SINGLE LENS REFLEX CAMERA OF THROUGH-THE-LENS TYPE

BACKGROUND OF THE INVENTION

In a single lens reflex camera of inner light receiving type (T T L type) and having a photosensitive element arranged in the view finder light path, for example, at the side of the light exit surface of a pentaprism, light measurement result is influenced by a reverse incident light coming from an eyepiece. Such an influence results in adding the part of said reverse incident light reaching the photosensitive element to the light intensity of an object to be photographed which is to be measured, and this addition of light causes a corresponding photometric error. This reverse incident light comprises a light beam coming through the eyepiece into the pentaprism, reflected by said prism to the mirror obliquely located in the light path of the objective and directed through the objective, and a light beam reflected in the prism and directed again toward the eyepiece. A part of the light beam thus directed again toward the eyepiece will, after reverse incidence, fall on photosensitive elements located on both sides of the eyepiece.

The electric shutter mechanism in the single lens reflex camera of this type includes a means adapted to detect by the photosensitive elements the light intensity of an object to be photographed immediately before the mirror snaps up in operative association with shutter release operation and to store this detected data at least until the shutter closes. Generally a capacitor data memory means is used for this purpose.

SUMMARY OF THE INVENTION

To eliminate error in photometry due to the reverse incident light with the above arrangement and under the operating conditions as mentioned above, an amount corresponding to photometric error may be subtracted from the amount stored in the data memory means. The present invention is intended to provide a particular arrangement which enables such subtraction to be practically carried out.

DETAILED DESCRIPTION

Figure 1:
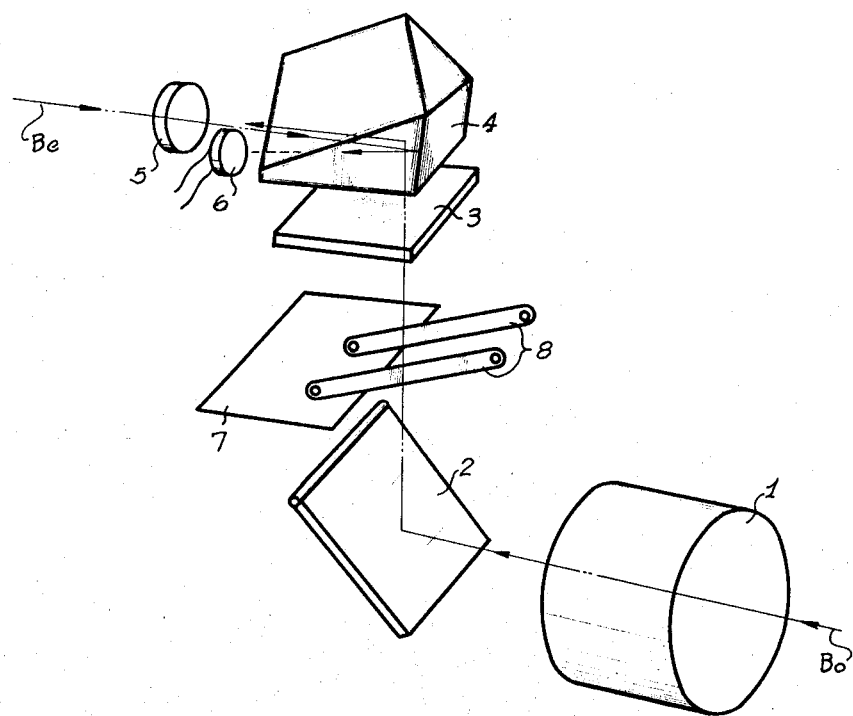
FIG. 1 is a perspective view showing by way of example the principal part of the device according to the present invention.

FIG. 1 depicts a single lens reflex camera and embodies the present invention. Depicted are an objective lens 1 and light rays $B_0$ coming from an object to be photographed through the objective lens 1 reflected by a mirror 2 to a view finder ground glass 3, defining the view finder light path. Also depicted is a pentaprism 4 with its plane of incidence facing the ground glass 3 and with its light exit surface facing an eyepiece 5. A photosensitive element 6 is located on both sides of the eyepiece 5; only one photosensitive element 6 is shown for clarity.

A light intercepting plate 7 is located between a position to be occupied by the mirror 2 when it snaps up and the ground glass 3. Arms 8 support the light intercepting plate 7 and enable the latter to be moved into or retracted from the view finder light path. The light intercepting plate 7 normally occupies the retracted position and is controlled so that it enters into the light path in operative association with the first half of the depressing movement of the shutter release button (not shown). It is, of course, also possible to have an independent member serve only this purpose, or to have the above operation associated with the operation within the play of rotation of a member, such as a self-timer charge lever or a film winding lever.

Figure 2:
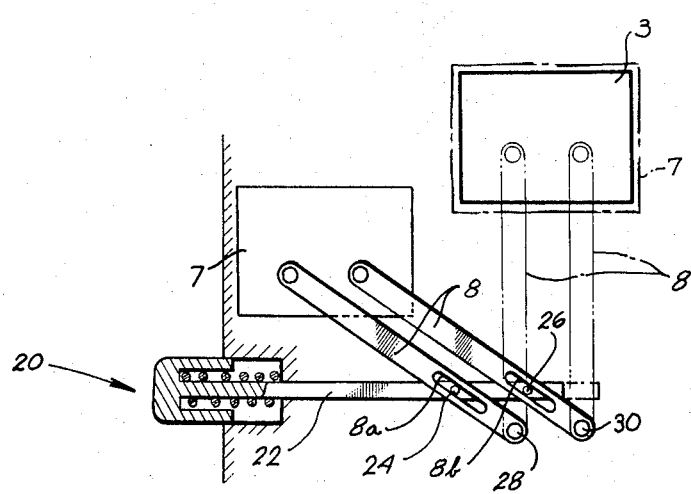
FIG. 2 is a plan view showing the visual field of the view finder wherein the light intercepting plate is actuated by a spring actuated button external to the camera.
Figure 3:
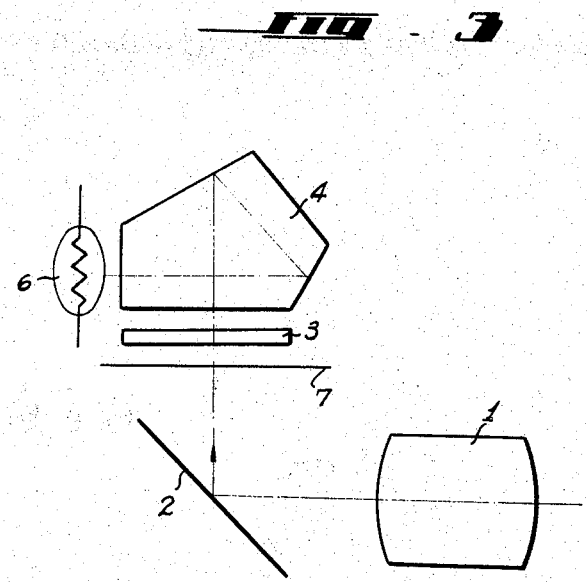
FIG. 3 is a side view showing an arrangement of the principal part of the device according to the present invention with arms and actuating mechanism for the light intercepting plate broken away for clarity.

FIG. 2 is a plan view showing the visual field of the view finder. FIG. 2 also depicts the aforementioned embodiment of the invention wherein an independent member is used to move the light intercepting plate 7 into or retract from the view finder light path. FIG. 2 depicts a spring loaded pushbutton assembly 20 wherein the pushbutton is loaded to the left as seen in FIG. 2. The top of the pushbutton is protruding to the exterior of the camera. Affixed to the portion 22 of the pushbutton assembly 20 are pins 24 and 26 which slide in elongated openings 8a provided in each of the arms 8 for the light intercepting plate 7. The lower ends of the arms 8 as depicted in FIG. 2 rotate about fixed pivots 28 and 30.

Normally the spring loaded pushbutton is maintained protruding to the left of the camera body as depicted in FIG. 2. In this position, the arms 8 are retracted via the pins 24 and 26 so that the light intercepting plate 7 is out of the light path. Depression of the spring loaded button 20 towards the right as shown in FIG. 2 causes the arms 8 and therefore the light intercepting plate 7 to move until the light intercepting plate enters into the light path as depicted by dot and dash lines.

Figure 4:
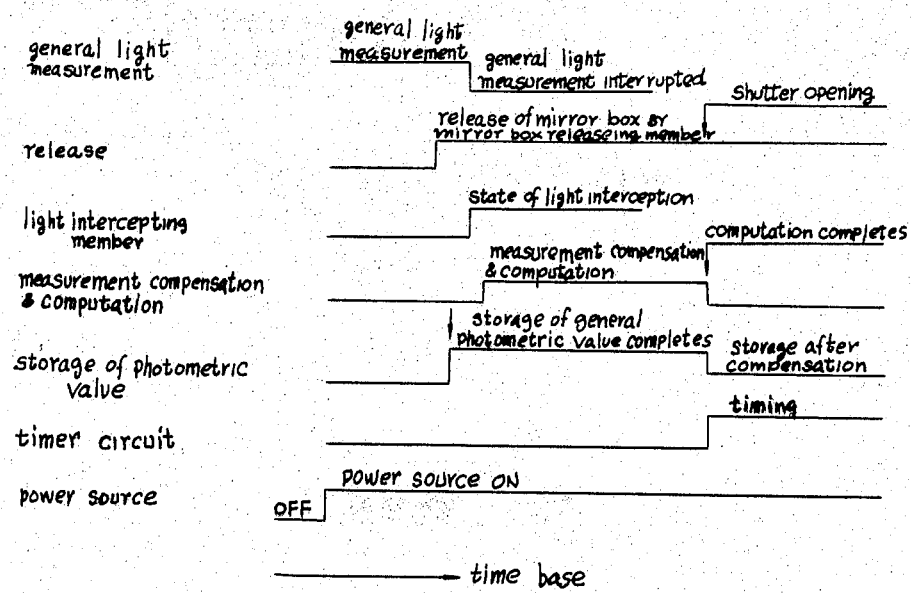
FIG. 4 is a timing chart illustrating the sequence of operation of the principal part of the device according to the present invention.

The manner in which the device according to the present invention operates will now be described with reference to the annexed drawings. Reference should be made to FIG. 4 which is a timing diagram illustrating the sequence of operation. A power source (not shown) is so arranged as to be connected to the electrical circuit (not shown) of the electric shutter mechanism (not shown) in the initial portion of the depression of the shutter button. Thus, upon depression of the shutter button, the circuit starts to operate to carry out light measurement and data storage according to data in the light intensity sensed by the photosensitive elements 6. At this time, the light rays $B_0$ from the object to be photographed and the part $B_e$ of reverse incident light coming from the eyepiece 5 and reflected by the pentaprism 4 (this part $B_e$ will hereinafter be referred to as the eyepiece light) are falling on the photosensitive elements 6. Subsequently depressing the shutter button (which is external to the camera), a release starting member is actuated to start snapping up of the mirror 2 during the first half of the shutter opening operation. In the embodiment where the light intercepting plate is controlled so as to move into the light path in operative association with the first half of the depressing movement of the shutter release button, the following action takes place. Simultaneously with or immediately before the mirror snaps up, the depressing movement of the shutter release button drives the light intercepting plate 7 so that it enters into the view finder light path (shown by the dash and dot lines in FIG. 2) from the retracted position (shown by the solid lines in FIG. 2).

The light rays $B_O$ from the object to be photographed are intercepted by the light intercepting plate 7 preventing them from falling on the photosensitive elements 6 the moment the light intercepting plate 7 enters into the light path and, as a result, only the eyepiece light rays $B_e$ are incident on the photosensitive elements 6. In other words, the part of the light rays in the reverse incident light rays which are directed through the pentaprism 4 to the mirror 2 and then to the objective 1 are intercepted and absorbed by the light intercepting plate 7, so that the amount of the eyepiece light rays $B_e$ when the light intercepting plate 7 retracts from the light path and the amount of the eyepiece light rays $B_e$ when the light intercepting plate 7 enters into the light path are detected as equal by the photosensitive elements 6.

The data detected by the photosensitive elements 6 after light interception is subtracted through an electrical computation process from the data on measurement of the eyepiece light rays which is previously stored as data from the eyepiece light rays $B_e$ but including the light rays $B_O$ from the object to be photographed. Thus the data on light measurement obtained by $(B_e+B_O)-B_e=B_O$ is then stored as the correct value of the light rays $B_O$ coming from the object to be photographed which is free from any influence of the eyepiece light rays $B_e$.

The above compensating operation is followed by the shutter opening which starts after the mirror 2 has snapped up and, at the same time, time adjusting operation is started by a time circuit of the well known art so that a predetermined shutter controlling operation is effected.

One may consider to provide a mirror 2 at the position to be occupied by the mirror 2 when it snaps up for intercepting the light rays $B_O$ from the object to be photographed. If the reverse incident light rays were measured under interception of the light rays $B_O$ from the object to be photographed by means of the mirror 2 itself, the light rays $B_O$ from the object to be photographed would certainly be intercepted by the rear surface of the mirror 2 at the snapped-up position, but the part of the light rays in reverse incident light rays which are directed through the pentaprism 4 and then the ground glass 3 would be reflected by the reflective surface of said mirror 2 and then directed again through the prism 4 to the photosensitive elements 6. It is impossible by this method, therefore, to measure only the eyepeice light rays $B_e$ which have influenced the previous light measurement as the reverse incident light rays.

A device according to the present invention, on the other hand, provides a light intercepting plate separate from the mirror, which is adapted to enter into or retract from the view finder light path and enables first the general light measuring operation influenced by the reverse incident light rays and memory of data on this measurement, then measurement of only the eyepiece light rays as the reverse incident light rays, and finally, subtractive compensation of data on the eyepiece light rays from the data previously stored. A proper exposure time is thus obtained. Although the device of the present invention has been described by way of example referring to the annexed drawings particularly with respect to the case wherein the light intercepting plate enters into the light path in operative association with the first half of a shutter release operation, it is also possible to provide, as depicted in FIG. 2, a member for operating the light intercepting plate by arranging the device within the scope of the invention such that the storage of the data on the eyepiece light measurement is followed by the general light measurement, and the storage of the correct data in light rays from the object to be photographed is achieved by the electrical computation process between the above two data.

What is claimed is:

1. A single lens reflex camera of through-the-lens viewing type, having an objective lens, a pentaprism, a snap-up mirror, and a view finder and providing a light path for an image between the objective lens and view finder across the mirror through the pentaprism, the camera having an electrically controlled shutter system and a light metering system of through-the-lens type for control of the shutter and having a photo-sensitive sensing element for control of the metering system, the photo-sensitive element being located both in the light path and in the path of light from the view finder, the improvement comprising:

light intercepting means for preventing the light from the objective lens from reaching the photosensing element; and means for moving the light intercepting means into and out of the light path at a position along the light path in between the pentaprism and the mirror.

2. A single lens reflex camera according to claim 1 comprising means actuable external from the camera for controlling the movement of the light intercepting means.

3. A single lens reflex camera according to claim 2 wherein said means for moving normally holds the light intercepting means out of the light path between the objective lens and view finder, and the actuable means actuates the light intercepting means into the light path, thereby preventing light from the objective lens from reaching said photosensitive element.

4. A single lens reflex camera according to claim 3 wherein said light intercepting means is a movable plate.

5. A signle lens reflex camera according to claim 1 wherein said light intercepting means absorbs the light from said viewfinder lens.

6. A single lens reflex camera of through-the-lens viewing type, having an objective lens, a pentaprism, a snap-up mirror, and a view finder and providing a light path for an image between the objective lens and view finder across the mirror through the pentaprism, the camera having an electrically controlled shutter system and a light metering system of through-the-lens type for control of the shutter and having a photo-sensitive sensing element for control of the metering system, the photo-sensitive element being located both in the light path and in the path of light from the view finder, the improvement comprising:

a manually operable shutter release button and a light intercepting member for preventing light from reaching the photo-sensitive element, the method of indicating the amount of light from the view finder reaching the photo-sensitive element comprising the steps of:
a. responsive to depressing movement of the shutter release button, moving the light intercepting member into the light path from the objective lens, and
b. directing the light intercepting member at a position in between the pentaprism and the mirror, thereby preventing light from the objective lens from reaching the photo-sensing element while light from the view finder reaches the photo-sensitive element.

7. In a camera, the method according to claim 6 comprising the additional steps of:
a. moving the mirror out of the path of light from the objective lens; and
b. substantially simultaneously with moving the mirror, performing said step of moving the light intercepting member into the light path from the objective lens.

8. In a camera, the method according to claim 7 wherein said step of moving the light intercepting plate takes place immediately prior to the step of moving the mirror.

* * * * *

UNITED STATES PATENT OFFICE
CERTIFICATE OF CORRECTION

Patent No. 3,783,765          Dated Jan. 8, 1974

Inventor(s) Naoyuki Uno, Katsuhiko Nomura, Tadazumi Sakazaki; Koichiro Watanabe, Katsuhiko Miyata, Fumio Urano It is certified that error appears in the above-identified patent and that said Letters Patent are hereby corrected as shown below:

On the title page, the inventor's name "Katsuhiro" should be --Katsuhiko--.

Col. 1, line 16, "This" should read --Said--;
        line 36, before "error" insert --the--;
        line 39, before "photometric" insert --the--;
        line 55, before "arms" insert --the--.

Col. 4, line 49, "signle" should read --single--.

Signed and sealed this 16th day of July 1974.

(SEAL)
Attest:

McCOY M. GIBSON, JR.
Attesting Officer

C. MARSHALL DANN
Commissioner of Patents